United States Patent [19]

Haraguchi

[11] Patent Number: 5,153,624
[45] Date of Patent: Oct. 6, 1992

[54] CAMERA

[75] Inventor: Shousuke Haraguchi, Kanagawa, Japan

[73] Assignee: Canon Kabushiki Kaisha, Tokyo, Japan

[21] Appl. No.: 801,906

[22] Filed: Dec. 3, 1991

Related U.S. Application Data

[62] Division of Ser. No. 649,722, Feb. 1, 1991, Pat. No. 5,111,225.

[30] Foreign Application Priority Data

May 2, 1990 [JP] Japan .................................. 2-25735
Sep. 2, 1990 [JP] Japan .................................. 2-30031

[51] Int. Cl.⁵ ............................................. G03B 15/03
[52] U.S. Cl. ............................................. 354/149.11
[58] Field of Search .................................. 354/149.11

[56] References Cited

U.S. PATENT DOCUMENTS 4,893,140 1/1990 Yamamoto et al. ............ 354/149.11
5,012,269 4/1991 Tosaka et al. ............... 354/149.11 X
5,066,967 11/1991 Yamamoto et al. ............ 354/149.11

Primary Examiner—Michael L. Gellner
Attorney, Agent, or Firm—Fitzpatrick, Cella, Harper & Scinto

[57] ABSTRACT

A camera that comprises a flash unit supported swingably between a down position and an up position, a first drive mechanism for supplying a drive force to move the flash unit in a specific direction, and a second drive mechanism for supplying a drive force to move the flash unit in the specific direction. The drive force of the second drive mechanism is controlled to be lower than that of the first drive mechanism by a control circuit.

5 Claims, 16 Drawing Sheets

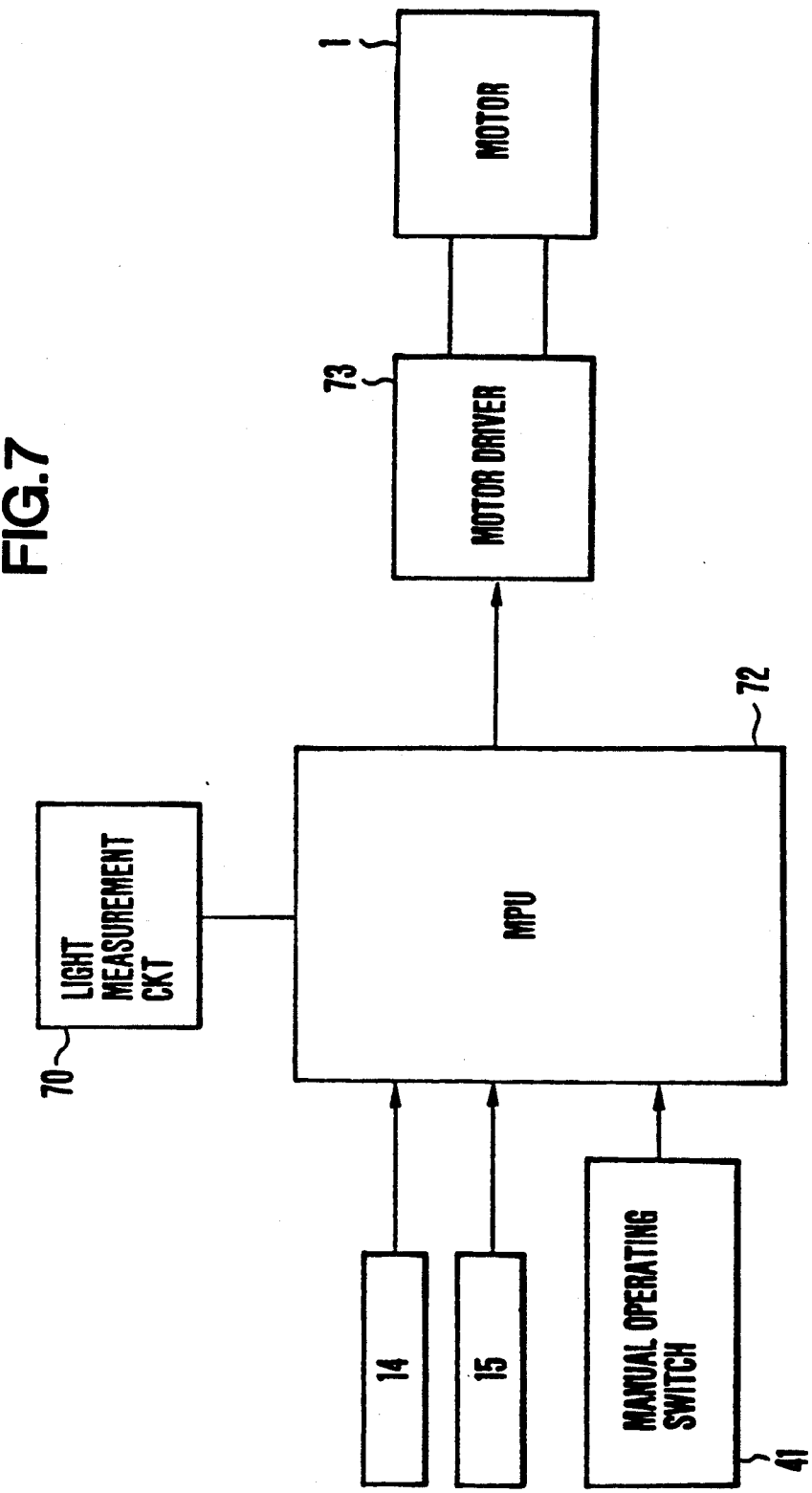

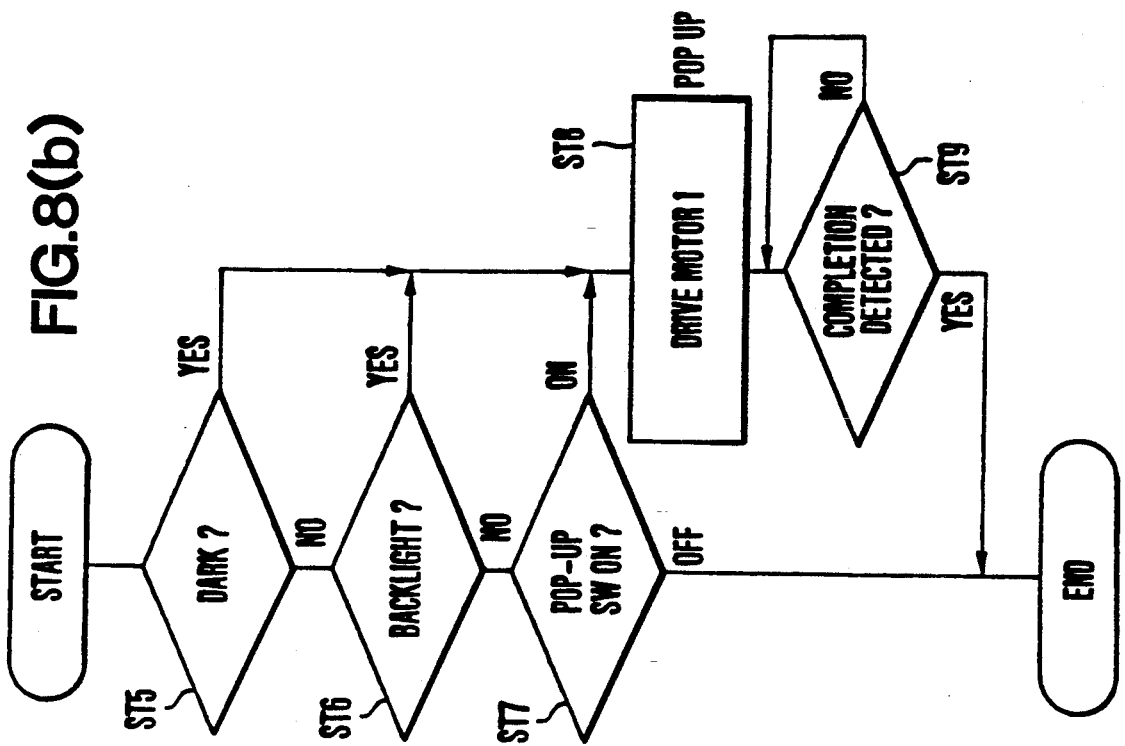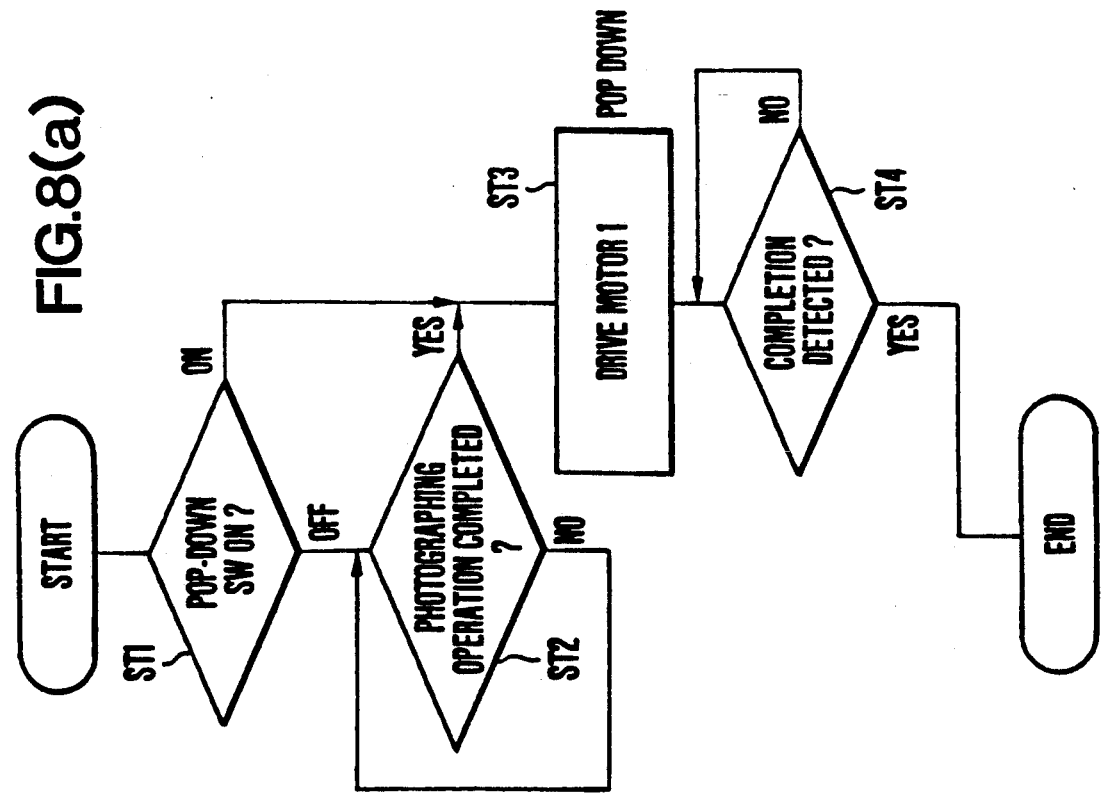

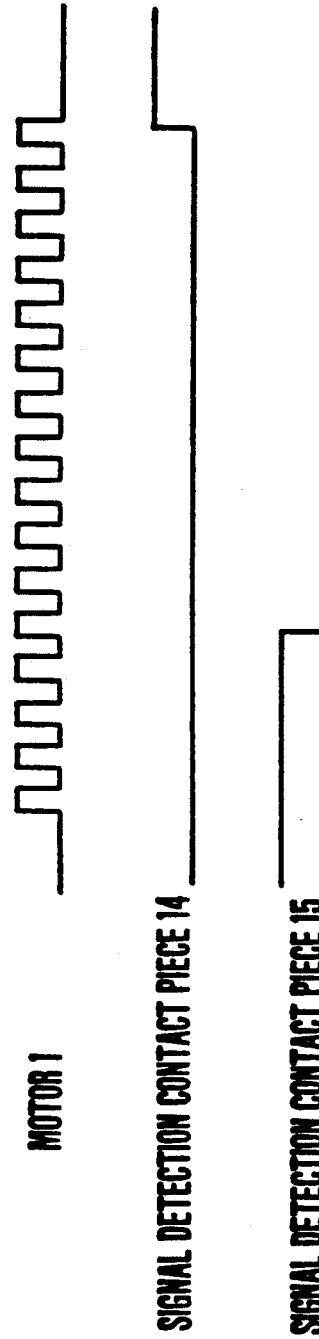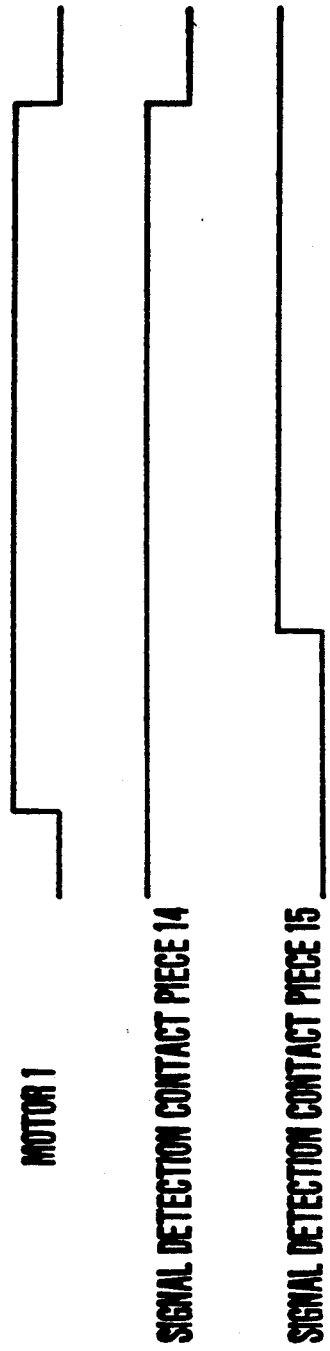

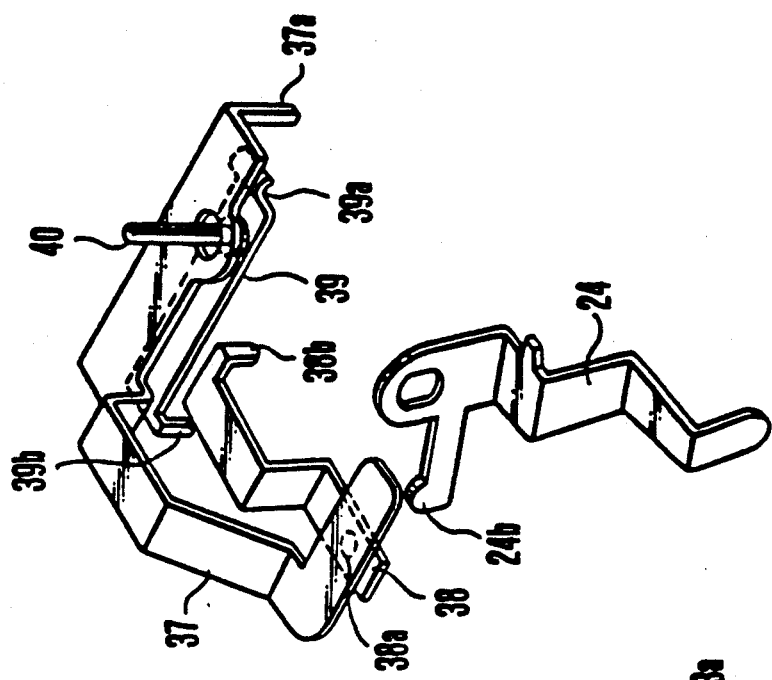
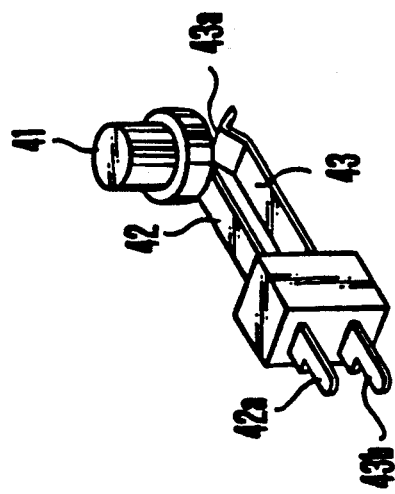
FIG.14(b)
FIG.14(a)

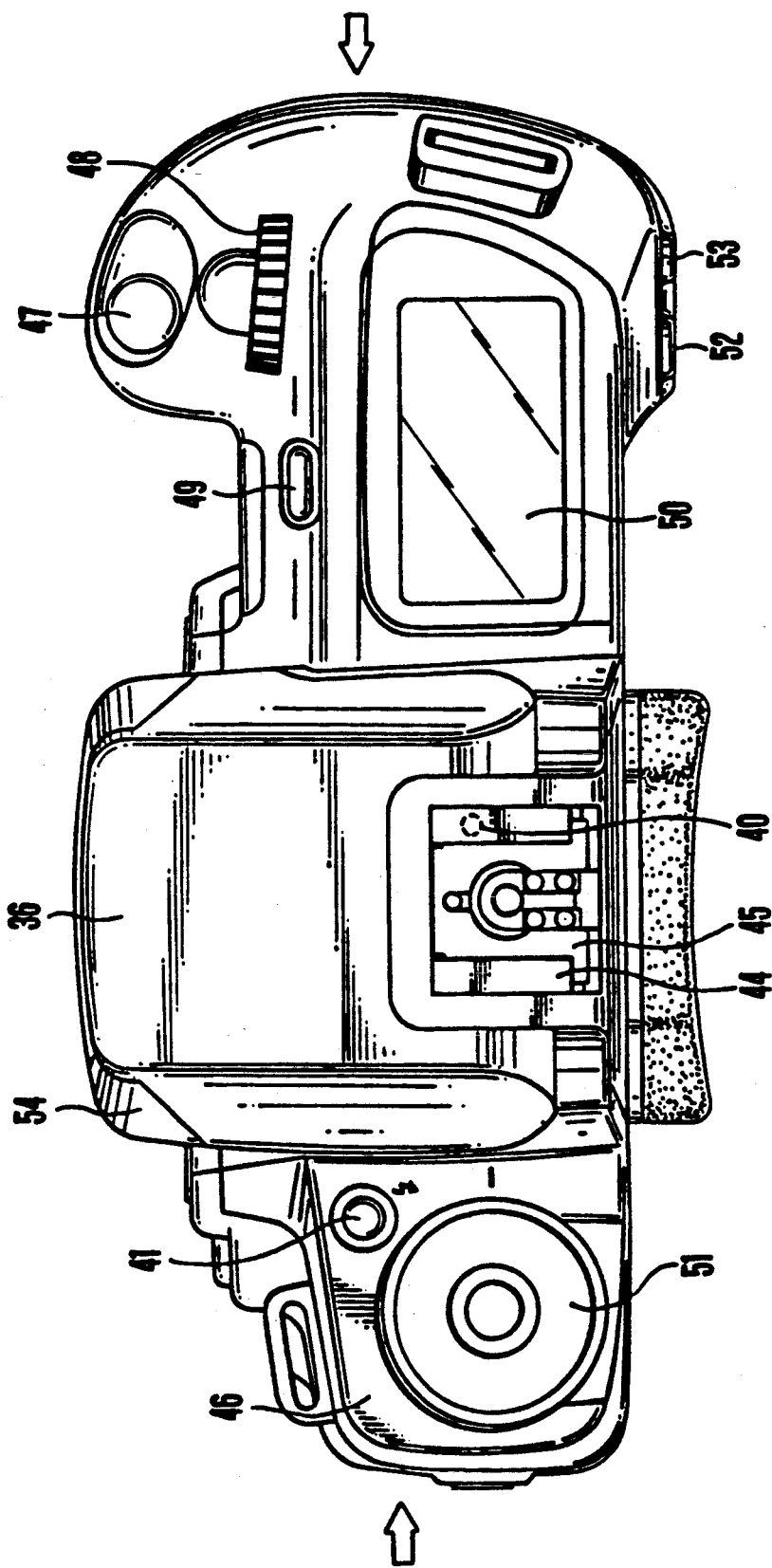

CAMERA

This application is a division of application Ser. No. 07/649,722 filed Feb. 1, 1991, now U.S. Pat. No. 5,111,225.

BACKGROUND OF THE INVENTION

1. Field of the Invention

This invention relates to a camera which pops a light emitting portion of a flash unit up and down.

2. Description of the Related Art

A conventional method of moving a flash unit case up and down, having the light emitting portion of a flash unit integrated in the body of a camera, by a motor as a drive source, is suggested in U.S. Pat. No. 4,545,667. In this method, a flash unit driving cam driven by a motor is rotated in one direction, and a flash unit case is moved up at the maximum lift position of the driving cam and retracted into the body of a camera by the force of a spring at the minimum lift position of the cam. Specifically, there is provided a first spring for moving the flash unit case up and a second spring for storing a stronger force than that of the first spring and moving the flash unit case down. By driving a driving lever, urged by the second spring for the downward movement, by the driving cam and putting the driving lever aside at the maximum lift position of the driving cam, the flash unit case is moved up by the first spring, while the urging force of the second spring to the driving lever overcomes that of the first spring at the minimum lift position of the driving cam so as to move the flash unit case down.

However, in the above prior art, when the flash unit case is being moved downward during the movement of the cam from the maximum lift position to the minimum lift position, the lift of the cam rapidly changes and the flash unit case is moved by only the force of the spring, resulting in big impulsive sounds and bounds. Furthermore, since the balance of the springs is essential, that is, the force of the second spring for the downward movement should be set sufficiently stronger than that of the first spring, it is difficult to stabilize the retention force of the flash unit case while the flash unit case is being moved down. In addition, since the force of the second spring by a full stroke is changed when the flash unit case is moved up, much energy is lost.

SUMMARY OF THE INVENTION

According to one aspect of this invention, there is provided a camera which brakes the spring force of a spring member by controlling the current supplied to a motor when a flash light emitting portion of a flash unit is moved up or down by the spring force of the spring member, thereby preventing the flash light emitting portion from bounding at the up or down position thereof and impulsive sounds from arising.

BRIEF DESCRIPTION OF THE DRAWINGS

FIGS. 1 to 10 show a first embodiment of a camera according to this invention:

FIG. 1 is a side view showing the down state of a flash unit;

FIG. 2 is a plan view of a driving mechanism for the flash unit;

FIG. 3 is a side view showing the up state of the flash unit;

FIG. 4 is a plan view of the driving mechanism;

FIG. 5 is a top view of the camera;

FIG. 6 is a sectional view of the mechanism;

FIG. 7 is a block diagram of a flash unit driving system of the camera;

FIGS. 8(a) and (b) are diagram shown in FIG. 7;

FIG. 9 is flowcharts of the block a timing chart showing the duty current carrying control of a motor during a flash unit up operation; and FIG. 10 is a timing chart showing the current carrying to the motor during a flash unit down operation.

FIGS. 12 to 18 show a third embodiment of a camera according to this invention:

FIG. 12 is a side view of the down state of a flash unit;

FIG. 13 is a side view showing the up state of the flash unit;

FIG. 14(a) is a perspective view of an operating button;

FIG. 14(b) is a perspective view of a flash unit position detection switch;

FIG. 15 is a plan view of the camera;

FIG. 16 is a block diagram of a flash unit driving system of the camera; and

FIGS. 17 and 18 are flowcharts.

DETAILED DESCRIPTION OF THE PREFERRED EMBODIMENTS

This invention will now be described with reference to the embodiments shown in the figures.

Figure 1:
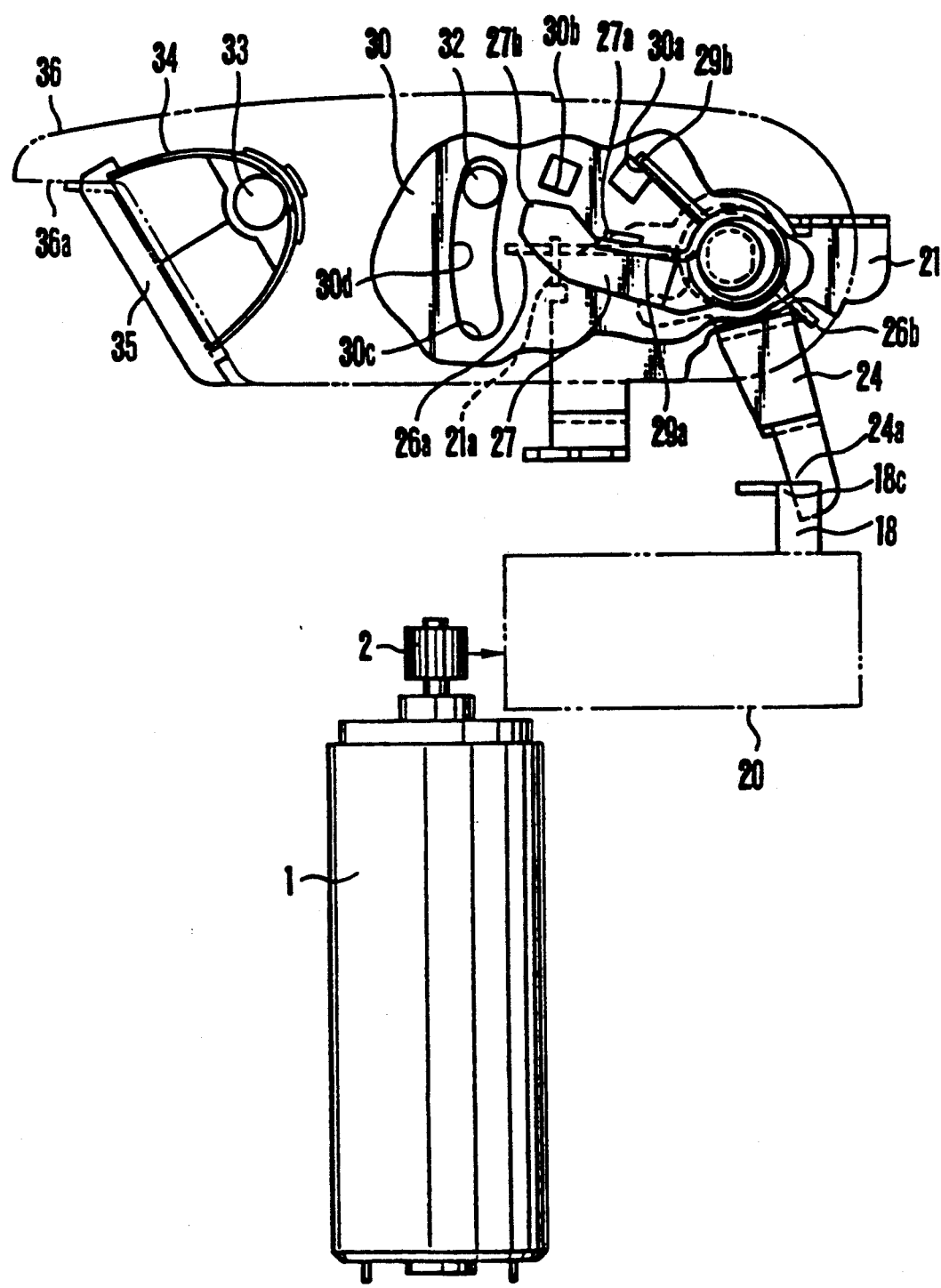
Figure 2:
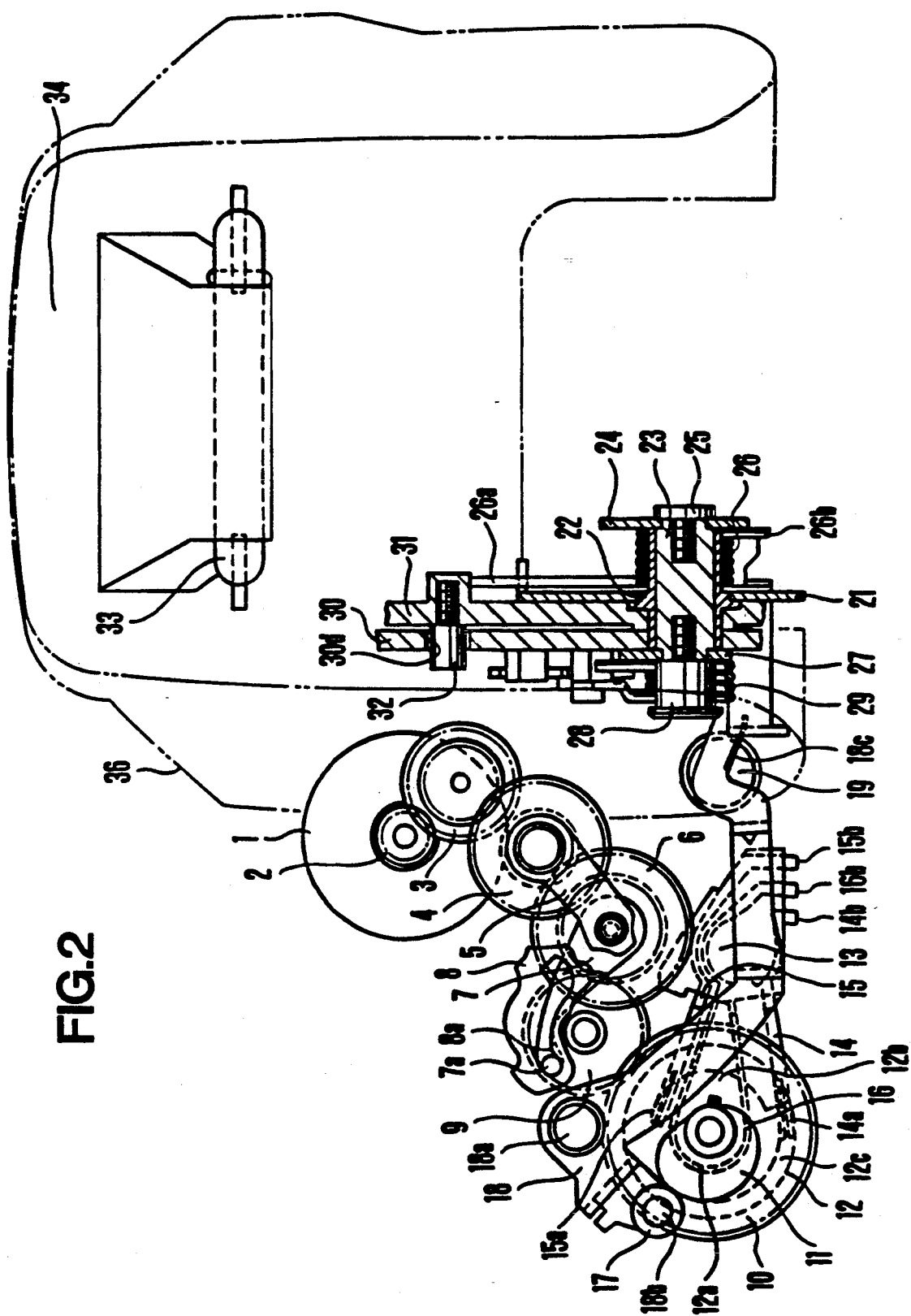
Figure 3:
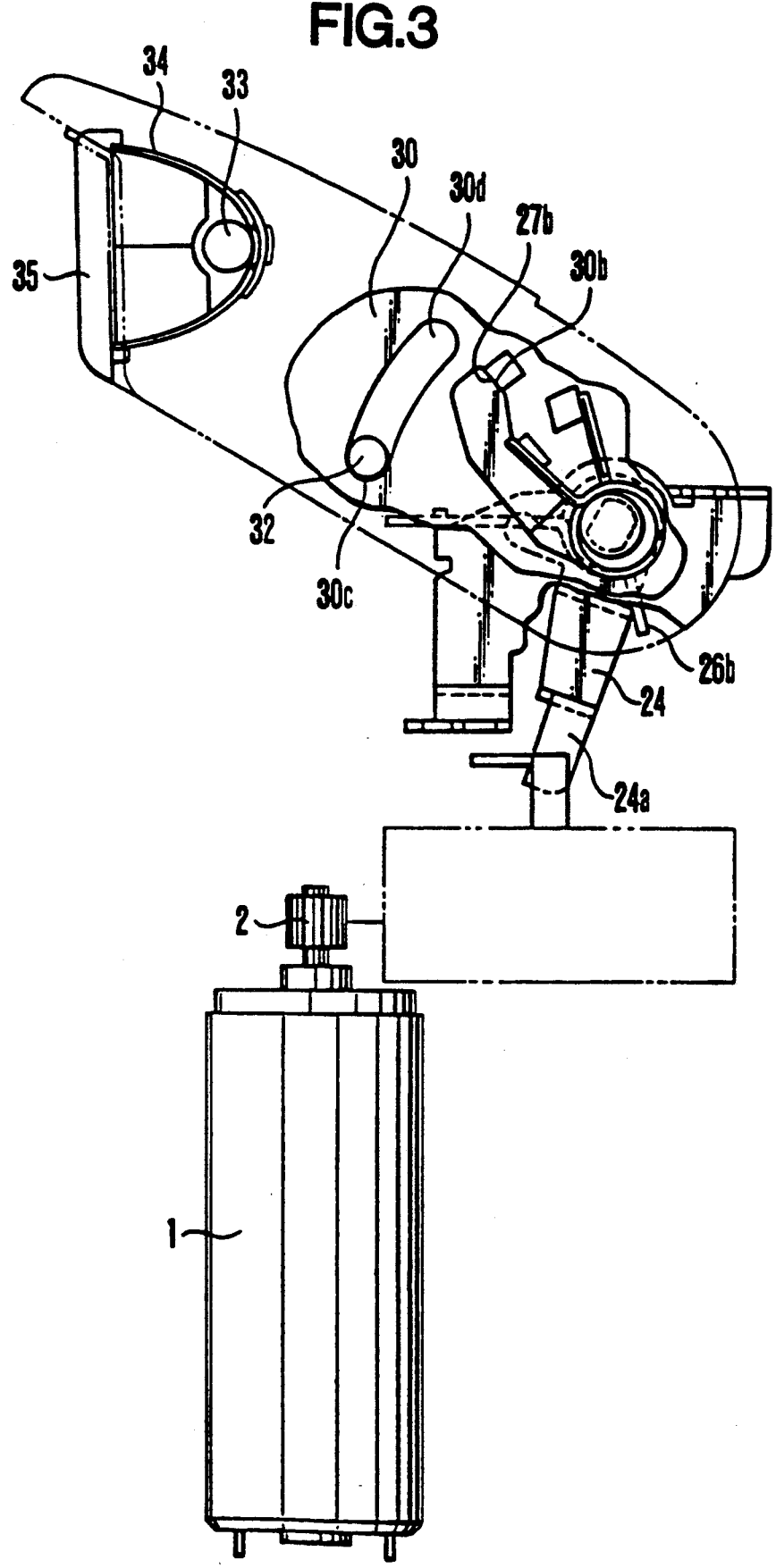
Figure 4:
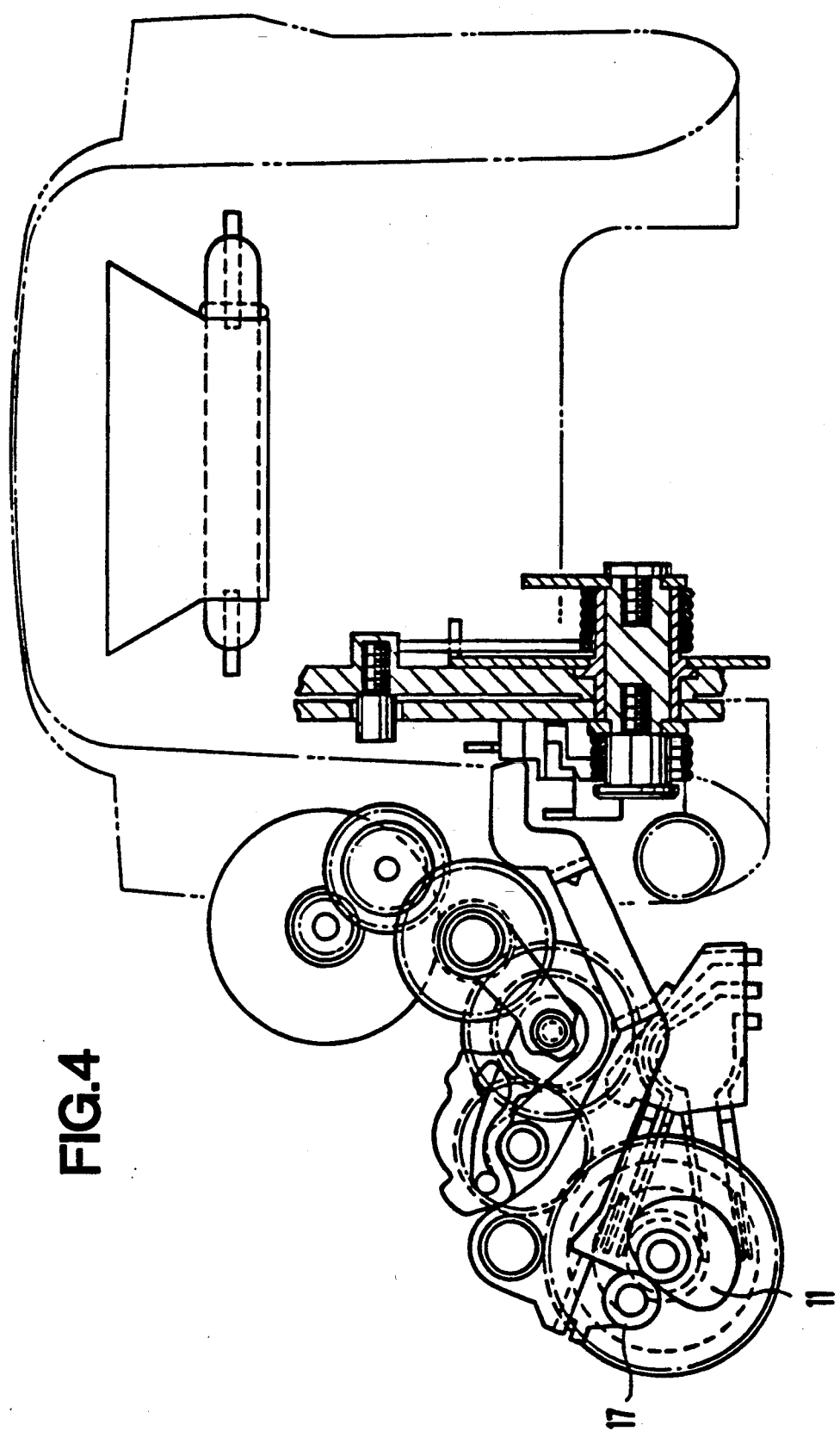
Figure 5:
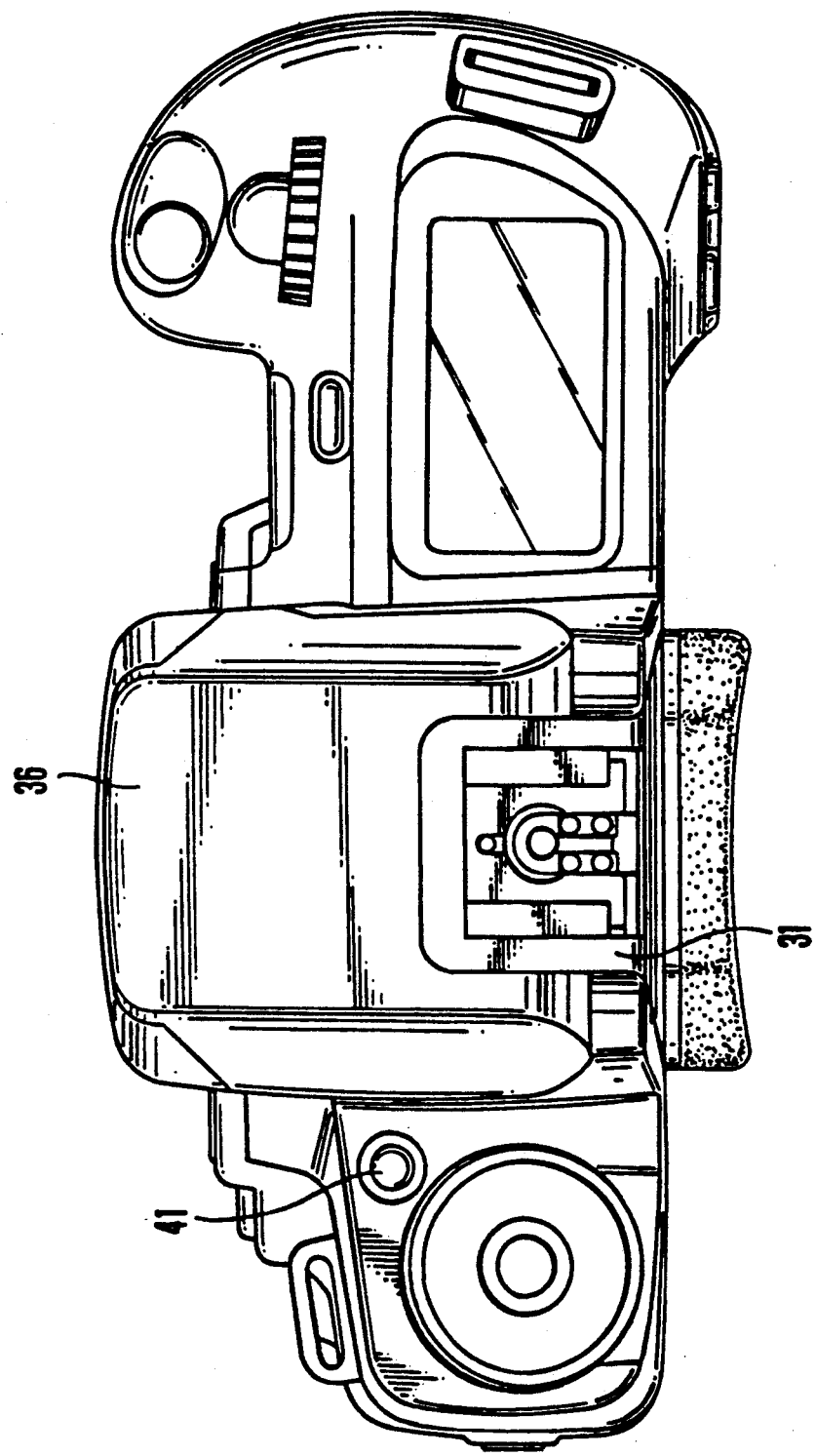
Figure 6:
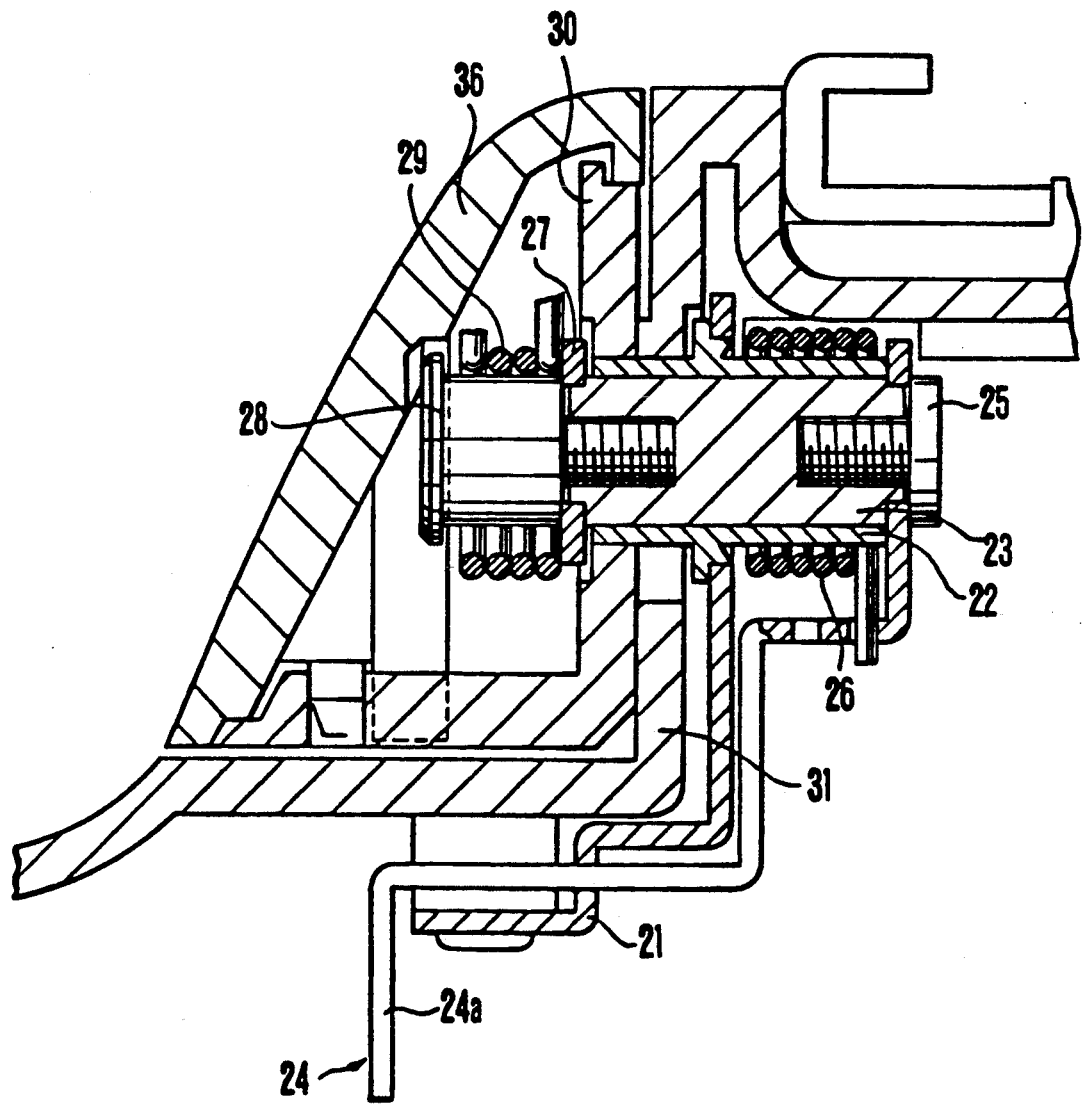

FIG. 1 is a side view of a first embodiment of a camera according to this invention showing the down state of a flash unit. FIG. 5 is a top view of the camera. FIG. 2 is a plan view of a flash unit up/down mechanism shown in FIG. 1, and FIG. 6 is a sectional view of the flash unit up/down mechanism. FIGS. 3 and 4 are side and plan views showing the up state of the flash unit.

In this embodiment, a flash light emitting portion is disposed above a pentagonal prism of a single-lens reflex camera, and a flash unit case 30 including the flash light emitting portion is moved up and down. A driving mechanism described below is classified into two portions: one is mounted on the side of the camera body and the other is mounted on an upper lid 31 of the camera body, which is disposed in the upper part of the camera body.

Numerals 1 and 2 denote a motor and a gear fixed to an output shaft of the motor 1, respectively. A gear 3 is a two-stage gear, which reduces and transmits the output of the gear 2 to a sun gear 4. A planet gear 6 is revolvably supported around the sun gear 4 though a planet arm 5. The revolution force is generated to the planet gear 6 by mounting an unillustrated friction mechanism. When the sun gear 4 is rotated clockwise, as shown in FIG. 2, the planet arm 6 engages a gear 9 so as to rotate a gear 10 formed integrally with a driving cam 11 counterclockwise. If the current carrying direction of the motor 1 is reversed, the sun gear 4 is rotated counterclockwise, the planet gear 6 is revolved counterclockwise and engages a gear 19. The gear 19 is coupled to an unillustrated mirror driving mechanism and an unillustrated shutter charging mechanism and is driven to carry out an exposure preparation operation. Since a driving method of driving the gear 19 and the associated mechanisms is well known in U.S. Pat. No. 4,864,336 and so on, the description thereof will be omitted. A planet switching restriction member 7 is frictionally coupled onto the same shaft as that of the planet gear 6. A planet switching restriction cam 8 restricts the movement of a restriction pin 7a. This mechanism prevents the planet gear 6 from being disengaged from the gear 9 when the planet gear 6 is reversely driven by the gear 9, and is well known in U.S. Pat. No. 4,766,452. Therefore, a detailed description thereof will be omitted.

As described above, the gear 10 is driven only counterclockwise. A phase detecting disc 12 is fixed to the gear 10, and rotates together with the gear 10 and is provided with conducting patterns 12a, 12b and 12c on the surface thereof. The three patterns are concentrically arranged in the conductive state. The whole circumference of the conducting pattern 12a having the shortest diameter is in the conductive state, and a ground (GND) potential is input from a connecting portion 16b of a GND contact piece 16 thereinto. When the conducting pattern 12c, having the longest diameter, is in contact with a contact 14a of a signal detection contact piece 14, a stop signal for stopping supply of the current to the motor 1 is produced. In the flash unit down state shown in FIG. 2, the contact 14a is in contact with the conducting pattern 12c, and a GND level signal is supplied to the signal detection contact piece 14. When the flash unit is moved up and reaches a predetermined stop phase, the conducting pattern 12c and the contact 14a come out of contact with each other and the signal detection contact piece 14 is put into the high level so as to stop the current supplied to the motor 1. When the conducting pattern 12b is in contact with a contact 15a of a signal detection contact piece 15, a stop position confirming signal in the up and down movements is produced. The signal detection contact piece 15 is supplied with a high level signal when the flash unit is at the down position and with a GND signal when the flash unit is at the up position. According to this arrangement, it is possible to confirm that the overrun, after the current supply to the motor is stopped, is within a predetermined range, and so on. The contact pieces 14, 15 and 16 are held by a holding member 13 and wired from connecting portions 14b, 15b and 16b.

A driving lever 18 is rockably supported on a shaft 18a and supports a roller 17 at a roller shaft 18b disposed on the side of a small lever portion thereof. The roller 17 is in contact with the driving cam 11. The driving cam 11 is in contact with the roller 17 at the maximum lift position thereof in the flash unit down state, and at the minimum lift position thereof, as shown in FIG. 4, in the flash unit up state. The above components constitute a driving mechanism disposed on the side of the camera body.

A driving mechanism disposed on the side of an upper lid 31 of the camera body to move up and down the flash unit case 30 by the linkage to the above driving lever 18 will now be described.

A holding member 21 for supporting the driving mechanism with respect to the camera body is fixed inside the upper lid 31 as shown in FIGS. 2 and 6. A tubular bearing 22 penetrates through and is fixed to the holding member 21 with a caulking. One end of the bearing 22 penetrates through a positioning hole formed on the side wall of the upper lid 31, and the rear end of the flash unit case 30 is rotatably supported on the penetrating end.

On the other hand, a transmission shaft 23 is rotatably inserted into the tubular bearing 22. An outer lever 27 is fixedly mounted to one end of the transmission shaft 23 at the position outside the flash unit case 30, and an inner lever 24 is fixedly mounted to the other end of the transmission shaft 23 by a screw 25 at the position inside the upper lid 31.

As described above, the flash unit case 30 is rotatable on the bearing 22. A stopper pin 32, shown in FIG. 3, for determining the flash unit up position and restricting the rotation is embedded in the outer surface of the upper lid 31, an extended hole 30d, into which the stopper pin 32 is fitted, is formed on the flash unit case 30, and the up position of the flash unit case 30 is determined by making a stopper portion 30c at the bottom of the extended hole 30d abut against the stopper pin 32. At the front end of the flash unit case 30, a flash light emitting portion composed of a xenon tube 33, a reflector 34 and a Fresnel lens 35 is mounted, and the periphery thereof is covered with a flash unit cover 36 so as to prevent a screw 28 for fixing the outer lever 27 and so on from being exposed outward. As shown in FIGS. 1 and 3, a lever abutting portion 30b, which abuts against an abutting portion 27b formed at the leading edge of the outer lever 27, and a spring retaining projection 30a by which one end arm 29b of an absorbing spring 29, described below, is retained are formed on the outer surface of the flash unit case 30. The absorbing spring 29 is mounted on the outer circumference of the screw 28. As shown in FIG. 1, an arm 29a at the other end of the absorbing spring 29 engages a retaining portion 27a of the outer lever 27, and the arm 29b at one end of the spring 29 is retained by the spring retaining projection 30a of the flash unit case 30. Thereby, the outer lever 27 is urged clockwise and the flash unit case 30 is urged counterclockwise by the spring 29. This urging force of the spring draws the flash unit case 30 and the outer lever 27 close to each other until the abutting portion 27b of the outer lever 27 and the lever abutting portion 30b of the flash unit case 30 come into contact with each other.

An up spring 26 for moving the flash unit case 30 up is mounted on the outer circumference of the bearing 22. One arm 26a of the up spring 26 is retained by a spring retaining portion 21a formed in the front portion of the holding member 21, and the other arm 26b thereof is retained by the inner lever 24. The inner lever 24 is urged clockwise by the spring 26, thereby generating the flash unit up force.

In other words, in the flash unit down position shown in FIG. 1, if the force of the up spring 26 is charged and the inner lever 24 is freed, the transmission shaft 23 is rotated clockwise through the inner lever 24 by the spring force of the up spring 26. The flash unit case 30 is rotated clockwise by the abutting of the abutting portion 27b of the outer lever 27 and the abutting portion 30b of the flash unit case 30 in correlation to the clockwise rotation of the transmission shaft 23. When the stopper portion 30c of the extended hole 30d on the flash unit case 30 abuts against the stopper pin 32 of the upper lid 31, the up operation of the flash unit case 30 is completed.

If the inner lever 24 is rotated counterclockwise in this state, the outer lever 27 continues to rotate counterclockwise through the transmission shaft 23 and the absorbing spring 29 until a stopper portion 36a, formed at the leading portion of a flash unit cover 36, abuts against an unillustrated stopper mounted on the upper lid 21. Furthermore, if the inner lever 24 is rotated counterclockwise, the outer lever 27 is rotated counterclockwise with resistance to the spring force of the absorbing spring 28, and then, the spring force is changed in the absorbing spring 28.

In this embodiment, the inner lever 24, for controlling the up and down movements of the flash unit case 30 by the clockwise and counterclockwise rotations thereof, is rotated by the above-mentioned driving lever 18, and a lever end portion 24a of the inner lever 24 and a lever end portion 18c of the driving lever 18 engage each other as shown in FIGS. 1 to 3. Therefore, in this embodiment, if an external downward force is applied to the flash unit case 30 by the hand in the flash unit up state (shown in FIG. 3) the flash unit case 30 can rotate with resistance to the spring force of the up spring 26.

In the flash unit down state shown in FIGS. 1 and 2, the inner lever 24 is rotated counterclockwise with resistance to the up spring 26 by the clockwise rotation of the driving lever 18. At this time, the stopper portion 36a of the flash unit cover 36 abuts against the unillustrated stopper, so that the counterclockwise rotations of the flash unit case 30 and the flash unit cover 36 are prevented. In this state, it is possible to control the mating portion of the flash unit cover 36 and an unillustrated armored component depending upon the space based on the abutting portions thereof. In order to absorb the difference among interfaces, such as the driving lever 18, a cam portion 18c, the inner lever 24 and so on, for connecting the camera body and the mechanism on the side of the upper lid the inner lever 24 is sufficiently overcharged counterclockwise and the surplus force thereof is absorbed by the absorbing spring 29. Furthermore, the retention force of the flash unit cover 36 is determined by the force of the absorbing spring 29. According to this embodiment, even if a big stored force of the absorbing spring 29 is set, since the operating angle thereof by the surplus force is small, the energy to be lost is extremely small.

FIGS. 3 and 4 show the flash unit up state according to this invention. The roller 17 abuts against the driving cam 11 at the minimum lift position. The inner lever 24 is rotated clockwise by the urging force of the up spring 26, and the abutting portion 27b of the outer lever 27, which rotates integrally with the inner lever 24, abuts against the abutting portion 30b of the flash unit case 30, thereby rotating the flash unit case 30 clockwise. The clockwise rotation of the flash unit case 30 is prevented by the contact of the stopper pin 32 and the abutting portion 30c, and the flash unit case 30 stops in the flash unit up position. Although only the driving sides of the rotary shaft and the stopper in the flash unit case 30 are illustrated, the other unillustrated ends are also similarly supported.

FIG. 5 is a view from the top of the camera. Numeral 41 denotes a manual operating switch.

FIG. 7 is a view of a control circuit of the camera according to this embodiment. The current supply to the motor 1 is controlled by inputting light measurement value information from a light measurement circuit 70 and a flash on/off signal from the manual operating switch 41 to a microprocessor (MPU) 72, executing a predetermined judgment by the MPU 72, and supplying a drive signal to a motor driver 73. The motor driver 73 has a bridge circuit capable of switching normal and reverse current carrying drives and the electrical brake state in which a short circuit is constituted. The signals from the signal detection contact pieces 14 and 15 are also input to the MPU 72, and the current supply is controlled by detecting the phase of the driving cam 11.

FIGS. 8(a) and 8(b) are flowcharts showing the operations of the MPU 72.

Referring to FIG. 8(a), when the manual operating switch 41 is turned on in a case where the flash unit is in the pop-up state (Step 1), or when a photographing operation is completed (Step 2), the current is supplied to the motor 1 so as to pop the flash unit down (Step 3) and the flash unit is rotated until it is detected that the flash unit has reached a predetermined pop-down position (Step 4).

Referring to FIG. 8(b), when it is judged according to the information from the light measurement circuit 70 in the flash unit pop-down state that an object is dark (Step 5) or that the backlight arises (Step 6) or when the manual operating switch 41 is turned on (Step 7), the current is carried to the motor 1 so as to pop the flash unit up (Step 8) and the flash unit is rotated until it is detected that the flash unit has reached the predetermined pop-up position (Step 9).

FIG. 9 shows the current carrying state of the motor 1 and the potential state of the signal detection contact pieces 14 and 15 during the flash unit pop-up operation. In the flash unit pop-down state, the signal detection contact piece 14 is at the GND level, the signal detection contact piece 15 is at the high level, and the current carrying to the motor 1 is started in response to the drive start signal from the MPU 72. The current supply pattern decreases the drive speed of the motor 1 by the duty current supply, which alternately repeats the current supply for a predetermined period, and the electrical braking for a predetermined period. The signal detection contact piece 15 is switched to the GND level during the drive, and furthermore, when the signal detection piece 14 is switched to the high level, the current supplied to the motor 1 is stopped and the electrical braking is continued.

FIG. 10 shows the current supply state of the motor 1 and the potential state of the signal detection contact pieces 14 and 15 during the flash unit pop-down operation. In the flash unit pop-up state the signal detection contact piece 14 is at the high level and the signal detection contact piece 15 is at the GND level. When the current carrying to the motor 1 is started, the signal detection contact piece 15 is switched to the high level, and furthermore, when the signal detection contact piece 14 is switched to the GND level, the current carrying to the motor 1 is stopped and the electrical braking is continued.

The operations of this embodiment will now be described.

The movement from the flash unit down state shown in FIGS. 1 and 2 to the flash unit up state shown in FIGS. 3 and 4 will be first described. The current supplied to the motor 1 is controlled according to the sequence shown in FIG. 9. The normal-direction current supply is executed for the motor 1 and the gear 10 starts rotating counterclockwise. The roller 17 starts moving from the top dead center area of the cam 11 to the minimum lift area. At this time, the inner lever 24 starts to turn clockwise by virtue of the urging force of the up spring 26, thereby also turning the driving lever 18 counterclockwise. The gear 10 is turned counterclockwise by the action of the roller 17 and the cam 11, so that a force for further increasing the rotation speed of the motor 1 in the normal-direction current carrying acts. The clockwise rotation of the gear 9 causes a force for driving the planet gear 6 counterclockwise, and the planet gear 6 is flicked, revolves counterclockwise and attempts to be freed from the engagement with the gear 9. However, since the plane switching restricting member 7 is urged counterclockwise by friction, the restricting pin 7a abuts against the stopper portion 8a of the planet switching restricting cam 8, and the gear 9 and the planet gear 6 are not disengaged from each other. Therefore, the rotation speed of the gear 9 does not exceed the speed controlled by the side of the motor 1. If the gears 6 and 9 are disengaged from each other, the flash unit is raised at the speed determined by the urging force of the up spring 26. The flash unit is moved up when being used to move the flash light emitting portion as far as possible from the optical axis of the photographic lens in order to prevent the red-eye phenomenon (the eyes seem red in the color photography), and it is required to make the arm between the rotary shaft and the flash light emitting portion as long as possible. Since the mass of the flash light emitting portion is not small, the angular moment around the driving shaft is enormous. In order to set the retention force larger than a predetermined value when moving the flash unit up, much urging force of the up spring 26 is required and extremely big impulses are caused at the time of the up movement, resulting in impulsive sounds and bounds. These results greatly vary depending upon the orientation tolerance of the camera. In this embodiment, since the engagement of the planet gear 6 and the gear 9 is assured while making it possible to use the reciprocal rotations of the motor by virtue of the planet clutch, the above phenomena can be prevented. However, if only the normal-direction current carrying is performed for the motor 1, it is impossible to sufficiently brake the lift speed of the flash unit up mechanism as described above and to completely prevent the impulsive sounds and bounds when the flash unit is moved up.

In this embodiment, as shown in FIG. 9, since the flash unit up speed is controlled by executing the duty current supply, which alternately repeats the current supply and the electrical braking to the motor 1 in every predetermined period, it is possible to completely prevent the impulsive sounds and bounds when the flash unit is moved up. The on-ratio and the cycle of the duty current carrying can be arbitrarily set at the best ones. At the start of the upward movement, since the roller 17 stops at the top dead center of the cam 11 and can be driven by only the torque which overcomes the frictional force caused by the urging force of the up spring 26 and the absorbing spring 29, it can easily be moved even if the above duty drive is performed, and the permissible range of the duty on-ratio is wide. It is needless to say that there is no problem in the state where the cam is going to the above minimum cam lift position.

When the phase detection contact piece 14 is switched from the GND level to the high level, the current carrying to the motor 1 is stopped and the electrical brake is applied so as to control the motor 1. If the signal of the phase detection contact piece 15 remains at the GND level in this state, it is judged that the stop phase of the cam 11 is permissible, and the photography sequence including the flash light emitting is subsequently carried out. If the signal of the phase detection contact piece 15 is not in a desired state, it is preferable to stop the flash unit at the normal stop position even by driving the motor again. If the normal stop position cannot be obtained by repeating the drive, it may be allowed to judge that trouble is caused, to provide a warning to the user and to stop the operations of the camera.

The drive from the flash unit up position shown in FIGS. 3 and 4 to the flash unit down position shown FIGS. 1 and 2 will now be described. The current supply to the motor 1 is controlled according to the sequence shown in FIG. 10. The normal-direction current supply is executed for the motor 1, so that the gear 10 starts rotating counterclockwise. The roller 17 starts moving from the minimum lift area of the cam 11 to the maximum lift area thereof. At this time, the driving lever 18 is turned clockwise with resistance to the urging force of the up spring 26, thereby rotating the inner lever 24 counterclockwise and starting the flash, unit down operation. The current supplied to the motor 1 is different from the above-mentioned current supply in the flash unit up time and the full current supply state is sustained. When the stopper portion 36a of the flash unit cover 36 abuts against the unillustrated stopper and stops at the down position thereof, the absorbing spring 29 is the engagement of the abutting portion 27b of the outer lever 27 and the abutting portion 30b of the flash unit case 30 is released. When the roller 17 reaches the top dead center of the cam 11, the phase detection contact piece 14 is changed from the high level to the GND level, the current supplied to the motor 1 is stopped and the electrical brake is applied. If the signal of the phase detection contact piece 15 is at the high level in this state, it is judged that the cam 11 is in the normal stop position and the control is ended. If a desired signal is not obtained, the same sequence as that in the above flash unit up time is carried out. As described above, since the absorbing spring 29 acts in the down state and makes it possible to hold the flash unit cover 36 by a strong force, even if a specific retaining mechanism is not mounted, no practical problems arise.

Figure 11:
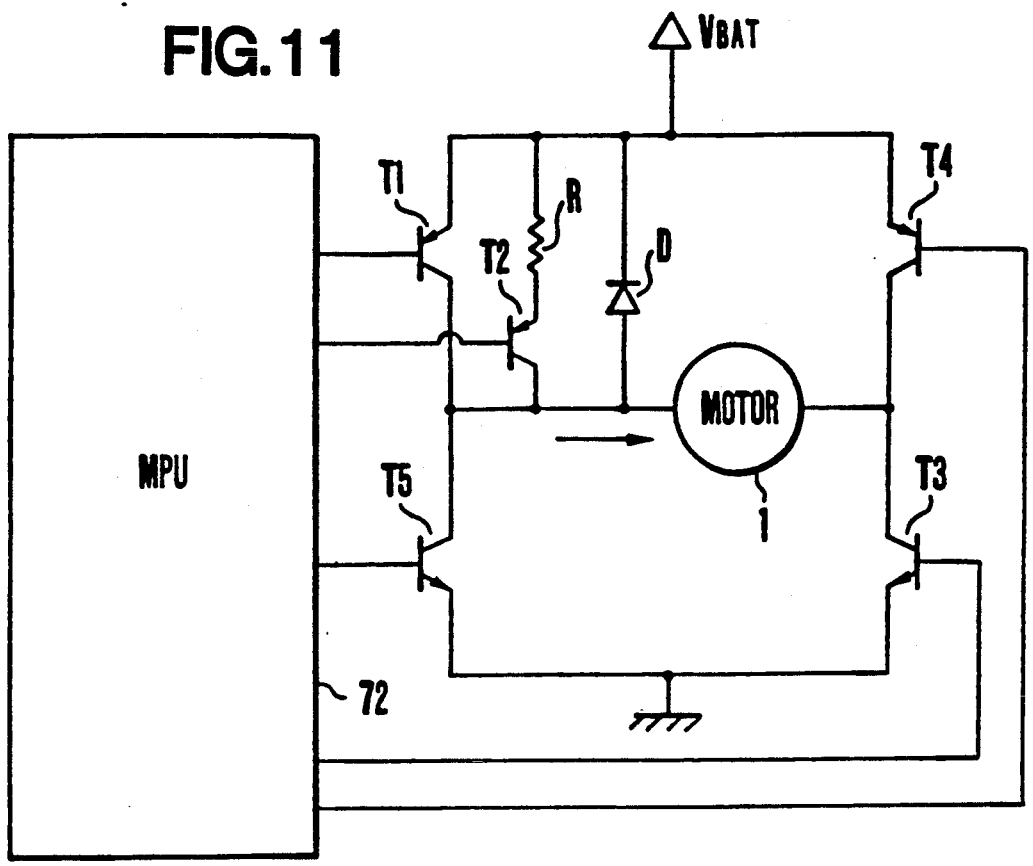
FIG. 11 is a circuit diagram of a motor driving circuit according to a second embodiment.

FIG. 11 shows a second embodiment of this invention. Although the duty current supply is performed to decrease the rotation speed of the motor 1 at the flash unit up time in the above embodiment, the interterminal voltage of the motor 1 is lowered in this embodiment. The current carrying to the motor 1 is controlled by the MPU 72 through transistors T1, T2, T3, T4 and T5. R and D designate a resistor and a diode, respectively. In the down movement of the flash unit, the MPU 72 turns on the transistors T1 and T3, supplies the current in the direction indicated by the arrow and normally rotates the motor 1. In the up movement of the flash unit, the MPU 72 turns on the transistors T2 and T3, thereby supplying the current in the direction indicated by he arrow through the resistor R and normally rotating the motor 1. Since the voltage drop is caused by the resistor R at this time, the interterminal voltage of the motor 1 drops and the rotation speed of the motor 1 decreases. Needless to say, as the resistance of the resistor R is increased, the voltage drop is increased and the rotation speed of the motor 1 is slowed down. The speed can be adjusted in the same manner as that of the current carrying described in the above embodiment. When the normal-direction current carrying is stopped, only the transistor T4 is turned on, the motor 1 is short-circuited through the diode D, and the electrical brake is applied. Although the description is omitted in this embodiment, when the motor 1 is reversely rotated for the drive on the side of the camera body, the transistors T4 and T5 are turned on and the current is supplied in the direction opposite to that indicated by the arrow. Furthermore, the method of lowering the motor interterminal voltage is not limited to this embodiment, and a drive by using a plurality of predetermined voltages with a transformer is possible.

As described above, according to the first and second embodiments, in the flash unit drive, which requires a great angular moment, since the pop-up speed of the flash unit is restricted by, for example, the duty current supply for the low-voltage drive of the motor, it is possible to minimize the impulsive sounds and bounds when the flash unit reaches the up position thereof and to achieve a high-quality flash unit drive. Especially, in order not to mount any special retaining mechanism at the non-use position of the flash unit, for example, at the flash unit down position, and to keep a sufficiently great retention force for the flash unit at the down position, and to reduce the loss of energy, it is required to set the maximum lift of the cam at the flash unit down position. Therefore, it is necessary to minimize impulses and bounds caused when the flash unit is moved up in the photograph preparation drive, and the minimization has much effect.

In a case where it is difficult to carry out a desired gear ratio speed reduction of the gears in the transmission mechanism for transmitting the driving force of the motor to the cam due to the restriction in space and so on, if the rotation angle on the side where the cam lift is raised is made sufficiently large, the rotation angle on the side where the cam lift is lowered is made small, and the cyclic on-ratio of the duty drive is selected o a desired voltage for the low-voltage drive is set, a desired performance can be obtained and that is effective in making the mechanism compact.

Although the speed reduction drive of the motor is performed in the movement of the flash unit form the down position to the up position in the above first and second embodiments, it is natural that impulsive sounds, bounds and so on can be similarly prevented by performing the speed reduction drive of the motor in the movement form the up position to the down position.

A third embodiment will now be described. The same components as those in the first embodiment are denoted by the same numerals and the description thereof is omitted.

Figure 12:
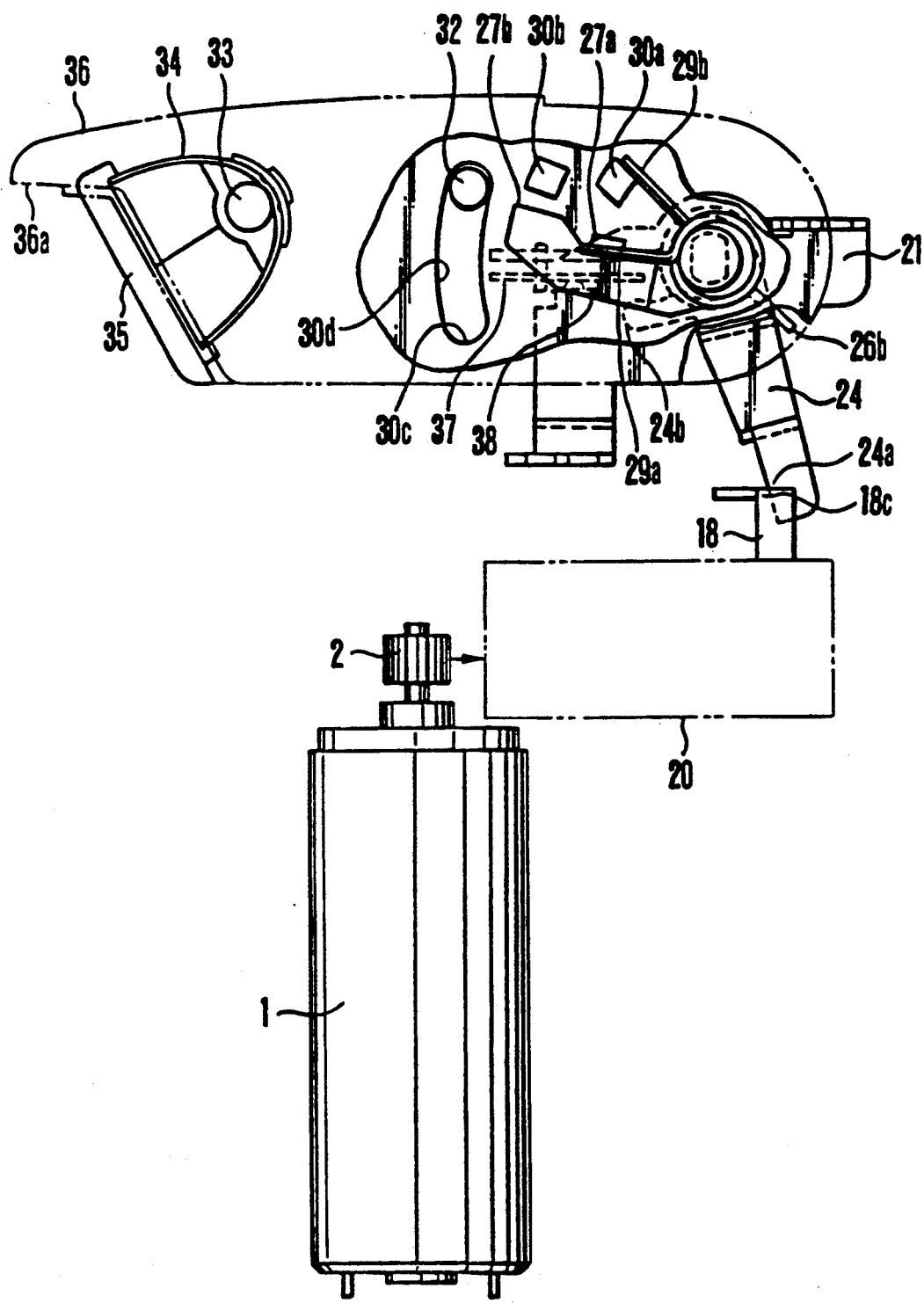
Figure 13:
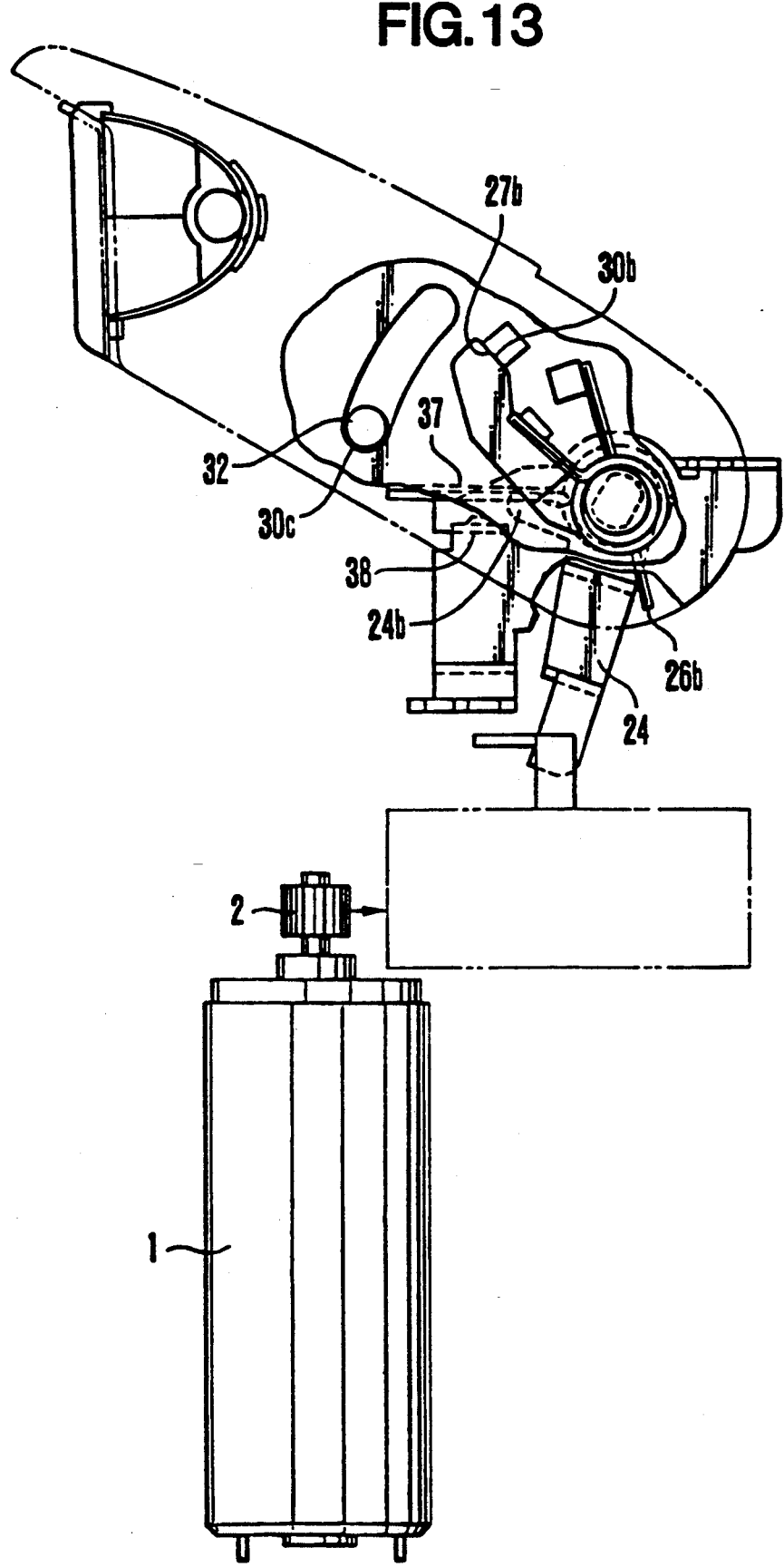

Referring to FIGS. 12 to 14(a) and 14(b), a signal contact piece 37 is mounted on the side of the upper lid 31 and a GND level signal is input from a terminal portion 37a thereof. A signal contact piece 38 abuts against the signal contact piece 37 at a contact 38a in the flash unit down state shown in FIG. 12 and is electrically connected to the signal contact piece 37. A terminal portion 38b is an output portion of a signal. As described above, the inner lever 24 is in the state shown in the figure at the flash unit down time, and, as shown in FIG. 12, a detection portion 24b, which is the other end of the inner lever 24, and the signal contact piece 37 are not in contact with each other. Since the detection portion 24b of the inner lever 24, as shown in FIG. 13, abuts against the signal contact piece 37 a the flash unit up time and the signal contact pieces 37 and 38 are not electrically connected to each other, the signal contact piece 38 outputs a high level signal. A detection pin 40 detects the attachment of an external flash unit, and when the external flash unit is attached, the contact of a signal contact piece 39 at a contact 39a with the signal contact piece 37 is released. In other words, the signal contact piece 39 outputs a GND level signal when the external flash unit is not attached and a high level signal when the external flash unit is attached, from a terminal portion 39b thereof. Referring to FIG. 14(a), when pressed, a manual operating switch 41 moves a signal contact piece 42 so as to be electrically connected to a contact 43a of a signal contact piece 43. A GND level signal is input from a terminal portion 42a, and a signal is output from a terminal portion 43b.

Referring to an external view of the camera shown in FIG. 15, numeral 44 denotes an accessory shoe and numeral 45 denotes a plate spring which aims to prevent backlashes in the attachment of the external flash unit. The above-mentioned detection pin 40 is mounted on a rail portion of the accessory shoe 44. The flash unit cover 36 is disposed to avoid the accessory shoe 44. The above operating switch 41 is mounted on an upper lid 46 on the left side symmetrical with respect to the flash unit cover 36 on the optical axis about a release button 47. Dials 48, 49, 52 and 53 are operating members for selecting modes and changing set values. Numeral 50 denotes an information display. A mode dial 51 selects photography modes by the rotation thereof. Although the detailed functions of the manual operating switch 41 are described below, the flash unit is alternately popped up and down by every press of the manual operating switch 41. Since the manual operating switch 41 is laid out so as to be operated by the left hand while operating the release button 47 and the like by the right hand or by viewing an unillustrated finder, the operability is enhanced. Furthermore, since the reverse operation is performed by a signal button, a quick operation can be achieved without any operating error. Especially, in an automatic focusing camera, since the operation of a distance ring by the left hand is unnecessary, the matching is good.

Figure 16:
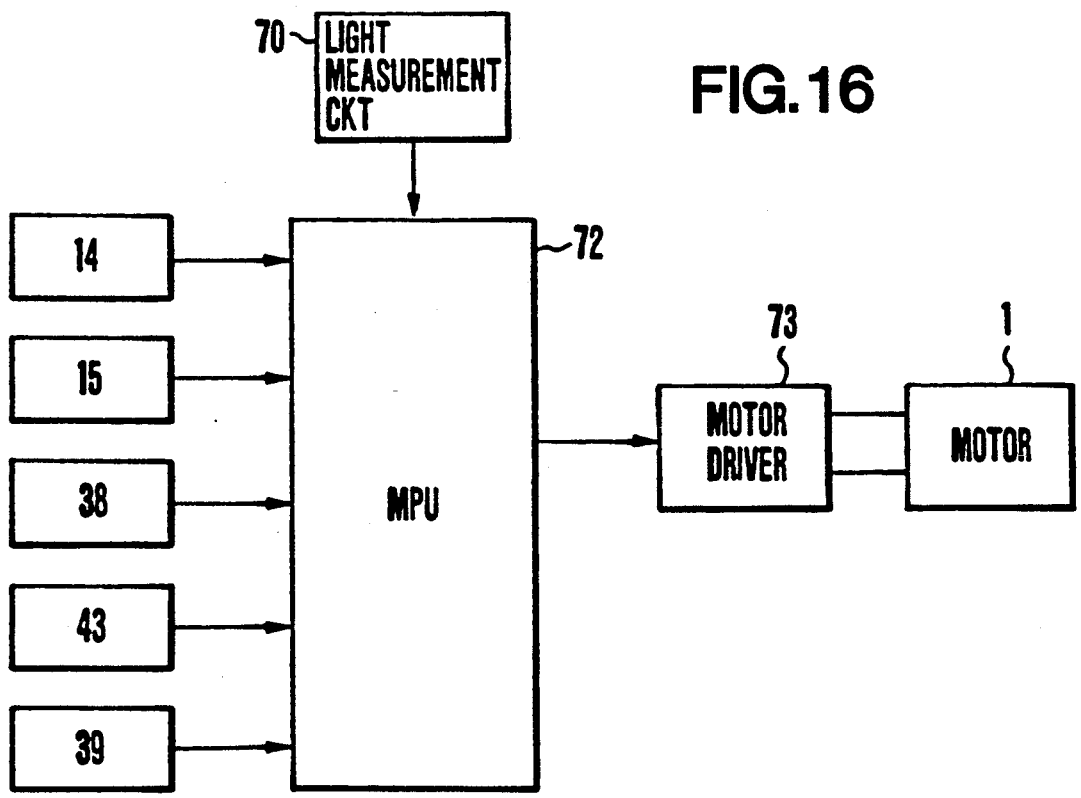

FIG. 16 shows a control circuit according to this embodiment. Light measurement information from the light measurement circuit 70, an output of the signal contact piece 38 for detecting the flash unit position, an output of the signal contact piece 43 generated by the operating switch 41 and an output of the signal contact piece 39 for detecting the attachment state of the external flash unit are input to the MPU 72, and outputs of the signal contact pieces 14 and 15 are also input to the MPU 72. Then, the phase of the cam 11 is detected, a drive signal is supplied to the motor driver 73 according to a predetermined sequence, and the current supply to the motor 1 is controlled. The motor driver 73 has a bridge circuit capable of switching between the normal and reverse current supplying drive and the electrical braking in which a short-circuit is constituted.

The current supplied state to the motor 1 and the potential state of the signal detection contact pieces 14 and 15 in the flash unit up state are operating the same as those shown in FIG. 9. In the flash unit down state, the signal detection contact piece 14 is at the GND level, the signal detection contact piece 15 is at the high level, and the current supply to the motor 1 is started in response to a drive start signal from the MPU 72. The current supply pattern decreases the drive speed of the motor 1 by the duty current supply, which repeats the current supply for a predetermined period and the electrical braking for a predetermined period. The signal detection contact piece 15 is switched to the GND level during the drive, and furthermore, when the signal detection contact piece 14 is switched to the high level, the current supplied to the motor 1 is stopped and the electrical braking is continued.

The current supply state of the motor 1 and the potential state of the signal detection contact pieces 14 and 15 during the flash unit down operation are the same as those shown in FIG. 10. In the flash unit up state, the signal detection contact piece 14 is at the high level and the signal detection contact piece 15 is at the GND level. When the current supply to the motor 1 is started, the signal detection contact piece 15 is switched to the high level, and furthermore, when the signal detection contact piece 14 is switched to the GND level, the current supply to the motor 1 is stopped and the electrical braking is continued.

The operations of this embodiment will now be described with reference to the flowcharts.

Figure 17:
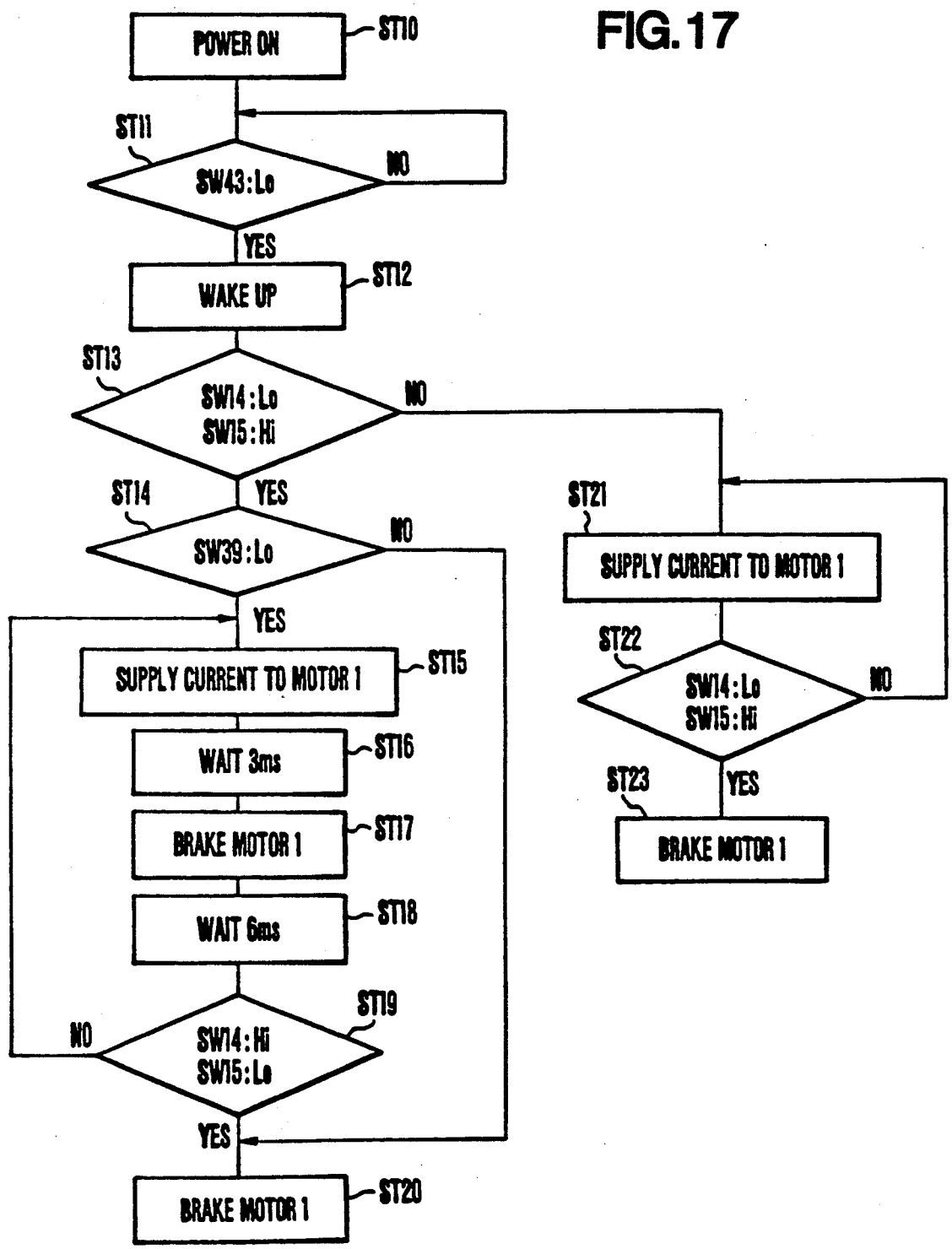

FIG. 17 is a flowchart explaining the operations when the manual operating switch 41 is manipulated. In the state where the power is turned on by rotating the mode dial 51 (Step 10), the signal level of the signal contact piece 43 is checked in a predetermined cycle (Step 11). If the signal is at the high level, the check is repeated. When the signal is switched to the low level, a wake-up operation is performed (Step 12) to operate an unillustrated DC/DC converter and various kinds of circuits. In order to detect the phase of the cam 11, the signals of the signal detection contact pieces 14 and 15 are checked (Step 13). If the outputs of the signal detection contact pieces 14 and 15 are at the low and high levels respectively, it is judged that the flash unit is in the down state. Furthermore, if the output of the signal contact piece 39 is at the low level and it is judged that the external flash unit is not attached (Step 14), the up movement of the flash unit is started. An intermittent duty current carrying, in which the current carrying to the motor 1 is started (Step 15), a wait for 3 ms is made (Step 16), the electrical brake is applied (Step 17) and a wait for 6 ms is made (Step 18), is repeated. When the signal detection contact pieces 14 and 15 are put into the high and low states respectively (Step 19), the current supplied to the motor 1 is stopped and the electrical brake is applied (Step 20). Then, the flash unit up operation is completed. When the phase of the cam 11 is detected as described above, if it is judged, based on the outputs from the signal contact pieces 14 and 15, that the flash unit is not in the down state, the current supply to the motor 1 is started (Step 21) and continued until the signal detection contact pieces 14 and 15 are switched to the low and high levels respectively (step 22), and the electrical brake is applied to the motor 1 (Step 23), thereby completing the flash unit down operation.

Figure 18:
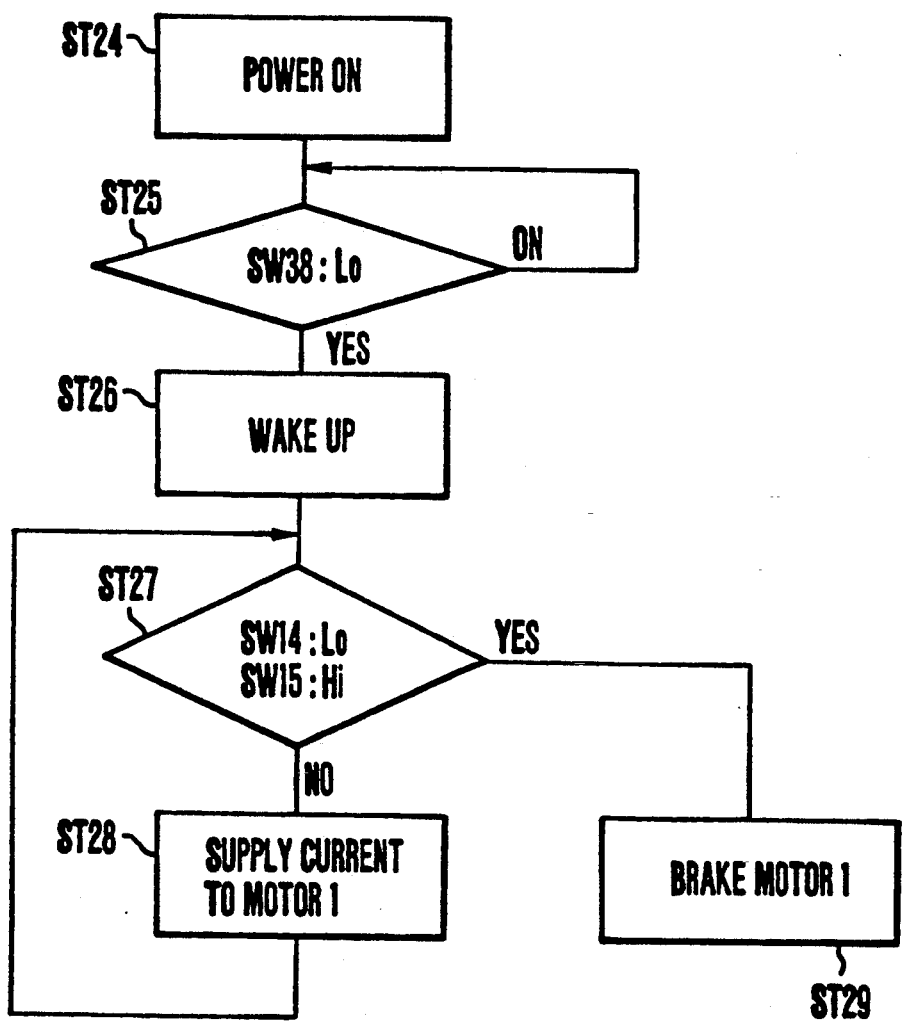

FIG. 18 is a flowchart showing the operations when the flash unit is pushed in by an external force. Similarly, in the state where the power is turned on by the mode dial 51 (Step 24), the signal level of the signal contact piece 38 is checked in a predetermined cycle (Step 25). If the signal is at the high level, the check is repeated. When the signal is switched to the low level, a wake-up operation is performed (Step 26) to operate the unillustrated DC/DC converter and the various kinds of circuits. In order to detect the phase of the cam 11, the signals of the signal detection contact pieces 14 and 15 are checked (Step 27). If the outputs of the signal detection contact pieces 14 and 15 are at the low and high levels respectively, it is judged that the flash unit is in the down state, the motor 1 is braked, and the sequence is completed (Step 29). If it cannot be judged that the flash unit is in the down state in the above sequence check, the current supply to the motor 1 is started and continued until the outputs of the signal detection contact pieces 14 and 15 are switched to the low and high levels respectively (Step 28) and the electrical brake is applied to the motor 1, thereby completing the flash unit down operation. Since the output of the signal contact piece 39 reaches the high level, the flash unit down operation is performed according to the flowchart similar to this sequence, the description of the detection of the flash unit attachment is omitted.

In other words, in the state where the flash unit is at the up position, the flash unit case 30 is movable downward by an external force, and one end 24a of the inner lever 24 is rotated counterclockwise in correlation to the movement of the flash unit case 30 without any interference by the end 18c of the driving lever 18. At that time, the detection portion 24b of the inner lever 24 pushes the signal contact piece 37 upward by the counterclockwise rotation of the inner lever 24 and moves the signal contact piece 37 from the flash unit up state where the signal contact piece 37 is not electrically connected to the signal contact piece 38 in the direction to make the signal contact piece 37 abut against the signal contact piece 38 by the elastic restoring force thereof and electrically connect the signal contact pieces 37 and 38 with each other. Then, a signal at the low level is output from the signal contact piece 38. The MPU 72 drives the motor 1, moves the driving lever 18, and makes the end 18c abut against the end 24a of the inner lever 24 being moved by the external force. Subsequently, it is possible to move the flash unit to the down position without depending upon the external force.

As described above, in the third embodiment, the flash light emitting portion is movable with resistance to the urging force of the spring at the flash unit up position and the position detection means for detecting that the flash light emitting portion is moved downward by a predetermined amount is mounted. Therefore, the flash unit is forced to move to the down position by slightly pushing the flash light emitting portion down by the external force, thereby eliminating troubles. Furthermore, it is possible to prevent damage and to reduce the load of the motor to move the flash unit up and down.

Especially, in a case where the flash unit is disposed adjacent to the accessory shoe as shown in this embodiment, when a specialized flash unit is mounted on the accessory shoe, a built-in flash unit may be pushed in its up state. In this case, since the built-in flash unit is automatically moved downward in this embodiment, no special operation is necessary.

Although the camera with the flash unit built therein is described in the above first, second and third embodiments, this invention also includes a camera from which a flash unit is detachable.

What is claimed is:

1. A camera comprising:
   (a) a flash unit supported swingably between a down position and an up position, said flash unit including at least a flash light emitting portion;
   (b) an accessory shoe disposed adjacent to said flash unit;
   (c) a down drive mechanism for swinging said flash unit toward said down position;
   (d) position detecting means for detecting that said flash unit has swung from said up position toward said down position; and
   (e) control means for forcibly operating said down drive mechanism when said position detecting means detects that said flash unit has swung from said up position toward said down position, so as to move said flash unit toward said down position by said down drive mechanism.

2. A camera according to claim 1, wherein said down drive mechanism is operated by a motor as a drive source thereof.

3. A camera according to claim 1, further comprising an up drive mechanism for swinging said flash unit from said down position toward said up position.

4. A camera according to claim 3, further comprising second control means for starting operations of said down drive mechanism and said up drive mechanism, said second control means being operated by a manipulation of a single operating switch.

5. A camera comprising:
   (a) a flash unit supported swingably between a down position and an up position, said flash unit including at least a flash light emitting portion;
   (b) a drive motor;
   (c) a spring for urging said flash light emitting portion in an up direction;
   (d) a drive transmission system for moving said flash light emitting portion in the up direction by the rotation of said motor through an urging force of said spring and in a down direction by charging said spring, and enabling said flash light emitting portion to move in the down direction by an external force;
   (e) position detecting means for detecting a movement of said flash light emitting portion from an up position to a down position; and
   (f) forcing drive means for moving said flash light emitting portion in the down direction by forcibly causing said drive motor to rotate when it is detected in response to a signal from said position detecting means that said flash light emitting portion has moved in the down direction by the external force.

* * * * *

UNITED STATES PATENT AND TRADEMARK OFFICE
CERTIFICATE OF CORRECTION

PATENT NO. : 5,153,624
DATED : October 6, 1992
INVENTOR(S) : Haraguchi

It is certified that error appears in the above-identified patent and that said Letters Patent is hereby corrected as shown below:

COLUMN 2:

Line 2, "the mechanism;" should read --the driving mechanism--;

Line 5, "are diagram" should read --are flowcharts of the block diagram--; and

Line 6, "flowcharts of the block" should be deleted.

COLUMN 5:

Line 28, "lid" should read --lid 31,--.

COLUMN 6:

Line 40, "state" should read --state,--.

UNITED STATES PATENT AND TRADEMARK OFFICE
CERTIFICATE OF CORRECTION

PATENT NO. : 5,153,624

DATED : October 6, 1992

INVENTOR(S) : Haraguchi

It is certified that error appears in the above-identified patent and that said Letters Patent is hereby corrected as shown below:

COLUMN 8:

Line 12, "flash," should read --flash--.

COLUMN 9:

Line 33, "form" should read --from--; and

Line 38, "form" should read --from--.

Signed and Sealed this

Twenty-sixth Day of October, 1993

Attest:

BRUCE LEHMAN

Attesting Officer

Commissioner of Patents and Trademarks